US007556654B1

(12) United States Patent
Nero

(10) Patent No.: US 7,556,654 B1
(45) **Date of Patent: *Jul. 7, 2009**

(54) METHODS FOR CLEANING MATERIALS

(75) Inventor: Micheal Nero, Brentwood, CA (US)

(73) Assignee: Naturell

( * ) Notice: Subject to any disclaimer, the term of this patent is extended or adjusted under 35 U.S.C. 154(b) by 12 days.

This patent is subject to a terminal disclaimer.

(21) Appl. No.: 11/405,324

(22) Filed: Apr. 17, 2006

Related U.S. Application Data

(63) Continuation-in-part of application No. 10/966,381, filed on Oct. 15, 2004, now Pat. No. 7,300,913, and a continuation-in-part of application No. 10/966,382, filed on Oct. 15, 2004, now Pat. No. 7,291,585.

(51) Int. Cl.
*C05F 11/00* (2006.01)
*A01N 25/00* (2006.01)
*C11D 3/00* (2006.01)

(52) U.S. Cl. ............................ 8/137; 134/2; 134/22.14; 134/22.19; 134/40; 134/41; 134/42; 239/307; 435/183

(58) Field of Classification Search ................. 514/783; 504/116; 239/307; 510/392, 393, 570; 8/137; 435/183; 134/2, 22.14, 22.19, 40, 41, 42
See application file for complete search history.

(56) References Cited

U.S. PATENT DOCUMENTS

| | | | | | |
|---|---|---|---|---|---|
| 4,069,538 | A | | 1/1978 | Fallen | |
| 4,186,031 | A | | 1/1980 | Armstrong et al. | |
| 4,870,010 | A | * | 9/1989 | Hayes | 424/114 |
| 4,998,314 | A | | 3/1991 | Borofsky | |
| 5,733,355 | A | | 3/1998 | Hibino et al. | |
| 6,223,380 | B1 | | 5/2001 | Klima et al. | |
| 6,284,012 | B1 | | 9/2001 | Mundschenk et al. | |
| 7,291,585 | B2 | * | 11/2007 | Nero | 510/393 |
| 7,300,913 | B2 | * | 11/2007 | Nero | 510/393 |
| 2002/0068101 | A1 | * | 6/2002 | DeAth et al. | 424/725 |
| 2003/0150936 | A1 | * | 8/2003 | Bristor | 239/307 |
| 2004/0171512 | A1 | * | 9/2004 | Furuta et al. | 510/470 |
| 2005/0176117 | A1 | * | 8/2005 | Russell et al. | 435/128 |
| 2005/0266036 | A1 | * | 12/2005 | Awada et al. | 424/405 |

FOREIGN PATENT DOCUMENTS

FR 2740779 * 5/1997

OTHER PUBLICATIONS

Seshadri et al. Applied Microbiolofy, Oct. 1971, p. 507-512, vol. 22, No. 4.*

Desai et al. "Microbial production of surfactant and thei commercial potential." Microb. and Molec. Biol. Rev., vol. 61, pp. 47-64, Mar. 1997.*

Levey et al. "A new surfactant made from kelp seaweed." Royal Soc. of Chem., 230, pp. 108-116, 1999.*

* cited by examiner

*Primary Examiner*—Lorna M Douyon
*Assistant Examiner*—Tri V Nguyen
(74) *Attorney, Agent, or Firm*—Tran & Associates

(57) ABSTRACT

Methods are disclosed for cleaning a material by applying a cleaning composition having one or more biosurfactants and one or more enzymes to the material. During use, the material is agitated with the cleaning composition. The cleaning composition can be used as a fabric cleaner, carpet cleaner, deodorizer, disinfectant, all purpose cleaner, kitchen counter cleaner, window cleaner, bar soap additive, septic and sewage cleaner, driveway and street cleaner, circuit board cleaner, wheel cleaner, toxic waste cleaner, clean-room cleaner, oil spill cleaner, soil treatment, or metal cleaner.

17 Claims, 3 Drawing Sheets

METHODS FOR CLEANING MATERIALS

This application is a continuation in part of application Ser. Nos. 10/966,381 now U.S. Pat. No. 7,300,913 (Oct. 15, 2004) and 10/966,382 now U.S. Pat. No. 7,291,585 (Oct. 15, 2004), the contents of which are incorporated by reference.

BACKGROUND

The present invention relates to systems and methods for cleaning materials.

Materials such as carpets produced from synthetic or natural fibers and mixtures thereof are commonly used in residential and commercial applications as a floor covering. Various types of fibers can be used in making carpets such as polyamide and wool. However, carpets irrespective of whether they are made from natural or synthetic fibers are all prone to soiling and staining when contacted with many household items. Foods, grease, oils, beverages such as coffee, tea and soft drinks especially those containing acidic dyes can cause unsightly, often dark stains on carpets. Also fibers may become soiled as a result of dirt particles, clay, dust, particulate soils in general, coming into contact with, and adhering to the fibers of the carpet. These latter soils often appear in the form of a diffuse layer of soils rather than in the form of spots and tend to accumulate particularly in the so called "high traffic areas" such as near doors as a result of intensive use of the carpets in such areas.

Carpet cleaning and maintenance conventionally involves the application of a detergent solution to the carpet followed by extraction. Detergents, however, are alkaline and are often the cause of re-soiling. Detergents also work best at very high temperatures, this can cause carpet to delaminate. The job of a detergent is to release dirt's and oils from the carpet surface, they are able to do this because they contain surfactants (short for surface acting agents). Surfactants are molecules that are both Hydrophilic (water soluble) and Hydrophobic (water insoluble). These molecules have the ability to lower the surface tension of water and emulsify (saturate) the surface that is being cleaned. This causes the dirt and oils to release from the surface they are attached to. Dirt and oil is hydrophobic, when it is released into liquid it is naturally attracted to other hydrophobic particles. Surfactants are half hydrophobic so they attach themselves to the dirt and oil, they are also hydrophilic so they are able to keep the dirt and oil suspended in liquid.

Surfactants found in detergents are made of petroleum distillates, natural fats and oils, short synthetic polymers, or large synthetic alcohols. These surfactants require certain conditions in order to function efficiently, high temperature and a ph of 9 or greater. This puts them on the alkaline side of the ph scale. Solutions that are alkaline are sticky and slimy by nature, this is why it is necessary to rinse well after using detergents otherwise they will leave a sticky alkaline residue that will attract more dirt. This is a bit of a problem when it comes to carpet cleaning because carpet is absorbent by nature and difficult to rinse without using large amounts of water, and wet indoor carpet is a haven for the growth of mold, mildew, and bacteria.

Biosurfactants are a structurally diverse group of surface-active molecules synthesized by microorganisms. Biosurfactants are amphipathic molecules consisting of both hydrophobic and hydrophilic domains. Due to their amphipathic nature, biosurfactants can partition at the interfaces between different fluid phases such as oil/water or water/air interfaces. Unlike synthetic surfactants, biosurfactants are effective in hot or cold water, and at either extreme of the ph scale. Classifications of biosurfactants include: Glycolipids, Rhamnolipids, Trehalolipids, Sophorolipids, lipopepdides, and lipoproteins.

SUMMARY

In a first aspect, a cleaning process includes applying a cleaning composition having one or more biosurfactants and one or more enzymes to the material. During use, the material is agitated with the cleaning composition.

The process includes applying a bacteria and a yeast to form the biosurfactants and the enzymes. The bacteria can be one of: *Bacillus brevis, Bacillus subtilis, Bacillus licheniformis*. The yeast can be one of: *Candida bombicola, Candida bogoriensis, Candida antartica, Torulopsis bombicola, Torulopsis petrophilum, Rhodotorula bogoriensis*. The cleaning composition can be lipopeptides or sophorolipids. The enzymes are derived from sea kelp. The enzymes react only with a predetermined set of molecules. Further, the enzymes decompose as the cleaning solution dries. The cleaning composition in one of: fabric cleaner, carpet cleaner, deodorizer, disinfectant, all purpose cleaner, kitchen counter cleaner, window cleaner, bar soap additive, septic and sewage cleaner, driveway and street cleaner, circuit board cleaner, wheel cleaner, toxic waist cleaner, clean-room cleaner, oil spill cleaner, soil treatment, metal cleaner.

The cleaning composition can include lipopeptides or sophorolipids. The enzyme decomposes as the cleaning solution dries. The enzyme can be derived from sea kelp and in one case, the process includes drying and crushing the sea kelp into a power. The process includes using *Laminaria digitata* as an organic medium and enzyme source and *Bacillus licheniformis* to produce lipopeptides. The enzyme in the *Laminaria digitata* can be Amylase, Diastase, Phosphatase, Catalase, Cytochrome, Lactic, oxidoreductases, transferases, hydrolases, lyases, isomerases, Pepsin, Trypsin, thioredoxin peroxidase, bromoperoxidase, mannuronan-C5-epimerase, or D-glucanase. The enzyme can be Amylase, Antibiotic, b-Lactamase, Penicillinase. A biosurfactant can be formed with a lipophilic part having i-, n-$C_{14}$ or i-, ai-$C^{\beta}_{15}$—OH fatty acid linked to a hydrophilic peptide moiety by a lactone linkage. Sophorolipids can be formed with enzymes secreted by *Torulopsis bombicola* reacting on an organic medium such as *Laminaria digitata*. The process can include storing the cleaning composition in a spray bottle, said spray bottle maintaining a lubricant inside a piston and wherein the piston is protected from the cleaning composition; spraying the cleaning composition onto said material; and applying a force to the material. Alternatively, the process can include storing the cleaning solution in a spray bottle, said spray bottle having lubricant maintained inside a piston to prevent exposure of the lubricant to the cleaning solution; spraying the cleaning solution to a material; and applying a circular rubbing motion to the material. When the material is a carpet, the process includes vacuuming said carpet prior to spraying said cleaning solution and bonnet-cleaning said carpet with a rotary floor cleaning machine.

In another aspect, systems and methods for cleaning a material by applying a spot cleaning composition having biosurfactants and enzymes to said carpet, wherein said spray bottle maintains lubricant inside its piston and protected from the composition.

Implementations of the above aspect may include one or more of the following. The material is vacuumed prior to applying the cleaning composition. The solution can be used as a fabric cleaner, carpet cleaner, deodorizer, disinfectant, all purpose cleaner, kitchen counter cleaner, window cleaner, bar soap additive, septic and sewage cleaner, driveway and street cleaner, circuit board cleaner, wheel cleaner, toxic waist cleaner, clean-room cleaner, oil spill cleaner, soil treatment, metal cleaner.

In another aspect, a method of cleaning a carpet includes storing an organic cleaning solution in a spray bottle, said spray bottle having lubricant maintained inside a piston to prevent exposure of the lubricant to the cleaning solution; spraying the organic cleaning solution to said carpet; and raking said carpet. The carpet can be vacuumed prior to spraying said cleaning solution. After applying the cleaning solution, the user can bonnet-clean the carpet such as by using a rotary floor cleaning machine. The cleaning solution comprises one or more bio-surfactants and enzymes.

In another aspect, a system for cleaning a material includes a spot cleaning bottle having lubricant inside a piston and protected from the composition; and a composition comprising one or more bio-surfactants and enzymes contained in said spot cleaning bottle.

Implementations of the system may include one or more of the following. A rake can be used to straighten the carpet fiber. The cleaning solution can be lipopeptide, sophorolipids, enzymes. The enzymes can be derived from sea kelp. The enzymes react only with a predetermined set of molecules. The enzymes decompose as the cleaning solution dries.

Advantages of the systems and methods may include one or more of the following. The solution differs from other products because it is not a detergent. All detergents whether they are petroleum or vegetable based are made up of synthetic surfactants. In order for synthetic surfactants to work they must have a pH of 9 or greater, this makes them alkaline or in other words they are sticky. Everything that is cleaned using detergents must be thoroughly rinsed (dishes, laundry, carpet, etc). In order to accommodate detergents a lot of water must be used. The solution allows cleaners to use about 95% less water per square foot than would be needed with hot water extraction. Although the cleaning solution is not a detergent, it is able to clean as well or better without being alkaline. The solution has no synthetic surfactants. The solution has no man-made chemicals and is 100% organic. It has a pH of 5 making it non alkaline. The solution uses components found in nature to replace man made chemicals in detergents, thus accommodating materials such as carpets and fabrics rather than accommodating the detergent. As a result, the solution has many uses including fabric cleaner, carpet cleaner, deodorizer, disinfectant, all purpose cleaner, kitchen counter cleaner, window cleaner, bar soap additive, septic and sewage cleaner, driveway and street cleaner, circuit board cleaner, wheel cleaner, toxic waist cleaner, clean-room cleaner, oil spill cleaner, soil treatment, metal cleaner.

For carpet cleaning application, an advantage of the system is that it is applicable to all carpet types, especially delicate natural fibers and is also safe to all carpet dye types, particularly sensitive natural dyes used therein. The cleaning solution is organic as it is derived Icelandic Sea kelp. The bio-surfactants are biodegradable and breaks down (decomposes) in nature. The solution is thus environmentally friendly. Stains and dirt are removed from carpets, leaving the finished carpet clean, dry and odor-free. Because the cleaning system does not blasting the dirt loose with a high pressure spray, the system needs very little moisture, about 95% less than a steam cleaner uses. With small amounts of moisture absorption is more effective than suction. Each fiber of the carpet is wiped from the base to the top from all directions by a super absorbent mop pad under a floor buffer. Because the mop pad is more absorbent than the carpet, the moisture and any dirt that wasn't dissolved by the enzymes is easily transferred from the carpet to the mop pad. The cleaning solution and pad are also able to neutralize alkaline residues. Because the cleaning solution is not a detergent, it doesn't leave a sticky residue. The carpet feels softer and stays clean longer with the instant method. The method also uses very little moisture, so carpet is usually dry in about 30 minutes. By greatly reducing the drying time, mold, mildew, bacteria, and dust might's have less of a chance to grow back. The lipopeptides are also a natural antibiotic: microbes are more likely to grow on a surface that was cleaned with bleach than they are to grow on a surface that was cleaned with the instant cleaning solution because the antibiotic nature of or lipopeptides leaves behind conditions that are inhospitable to the growth of microbes. The operation provides a great saving in time and labor, and is not injurious to the carpet pile. It is quiet, safe, and presents no inconvenience to the household. Another advantage of the present invention is that it may be applied directly on the carpet without causing damage to the carpet. In addition the cleaning action of the invention commences as soon as the carpet cleaning composition has been applied to the surface. Indeed, the use of the carpet cleaning composition prefers, but does not necessarily require, rubbing or/and brushing of the carpet. The carpet cleaning system extends useful carpet life and does not cause residue build-up. The resulting cleaned carpet is aesthetically appealing, wears well, and minimizes health problems arising from mold, mildew, bacteria, mites and other organisms that thrive in a dirty environment.

BRIEF DESCRIPTION OF THE DRAWINGS

The system will be better understood and aspects other than those set forth above will become apparent when consideration is given to the following detailed description thereof. Such description makes reference to the annexed drawings wherein.

DESCRIPTION

Figure 1:
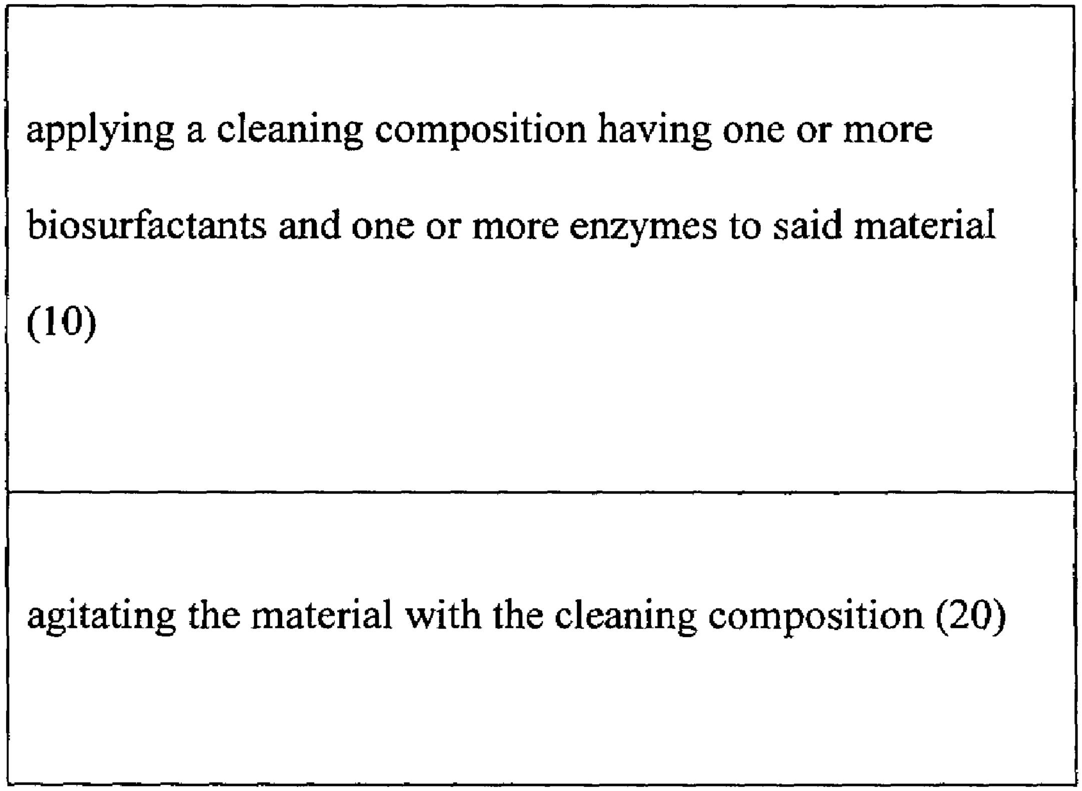
FIG. 1 is a process for cleaning a material.

FIG. 1 shows an exemplary process for cleaning a material. The process includes applying a cleaning composition having one or more biosurfactants and enzymes to said material (10). During use, the material is agitated with the cleaning composition (20).

The process includes applying a bacteria and a yeast to form the biosurfactant and the enzyme. The bacteria can be one of: *Bacillus brevis, Bacillus subtilis, Bacillus licheniformis*. The yeast can be one of: *Candida bombicola, Candida bogoriensis, Candida antartica, Torulopsis bombicola, Torulopsis petrophilum, Rhodotorula bogoriensis.*

The cleaning composition can be lipopeptides or sophorolipids. The enzymes are derived from sea kelp. The enzymes react only with a predetermined set of molecules. Further, the enzymes decompose as the cleaning solution dries.

The cleaning composition in one of: fabric cleaner, carpet cleaner, deodorizer, disinfectant, all purpose cleaner, kitchen counter cleaner, window cleaner, bar soap additive, septic and sewage cleaner, driveway and street cleaner, circuit board cleaner, wheel cleaner, toxic waist cleaner, clean-room cleaner, oil spill cleaner, soil treatment, metal cleaner.

In one embodiment, *Laminaria digitata* (brown algae or kelp) as an organic medium and enzyme source, *Bacillus licheniformis* (a strain of bacteria commonly found in soil) for the production of lipopeptides. *Torulopsis bombicola* (a type of yeast) can be used for the production of sophorolipids. In one embodiment water is added with *Laminaria digitata* in proportions of eight ounces of dry powder per gallon of water. In other embodiments either more or less *Laminaria digitata* can be used. *Bacillus licheniformis* can be used with two grams per gallon of organic medium. *Torulopsis bombicola* can be used with four grams per gallon of organic medium. This produces a heavy concentrate, which is diluted. In one embodiment, the dilution is four ounces per gallon of water to produce the spot cleaner.

Enzymes found in *Laminaria digitata* include: Amylase, Diastase, Phosphatase, Catalase, Cytochrome, Lactic, oxidoreductases, transferases, hydrolases, lyases, isomerases, Pepsin, Trypsin, thioredoxin peroxidase, bromoperoxidase, mannuronan-C5-epimerase, D-glucanase.

Enzymes and metabolites resulting from microbial action include: Amylase, Antibiotic, b-Lactamase, Penicillinase, Lipopeptides, Sophorolipids. Minerals found in *Laminaria digitata* are: Lysine, Methionine, Tryptophan, Arginine, Tyrosine, Serine, Threonine, Histidine, Phenylalanine, Cystine, Leucine, Isoleucine, Valine. Amino Acids found in *Laminaria digitata* are: Calcium, Phosphorus, Iodine, Iron, Copper, Magnesium, Zinc, Sulphur, Sodium, Chlorine, Potassium, Chlorine.

Lipopeptides are biosurfactants that are the product of enzymes secreted by *Bacillus Licheniformis* (a strain of bacteria commonly found in soil) reacting upon an organic medium (*Laminaria digitata*). They are able to lower the surface tension of water from 72 mN/m to 27 mN/m. Other surfactants are only able to lower surface tension into the 30s. These lipopeptides are a mixture of four closely related compounds. The lipophilic part consisting of i-, n-$C_{14}$ or i-, ai-$C^{\beta}_{15}$—OH fatty acids are linked to the hydrophilic peptide moiety, which contained seven amino acids (Glu, Asp, Val, three Leu and Ile) by a lactone linkage. The organic medium of *Laminaria digitata* is rich in lipids: PE, PC, PI, MGDG, and DGDG. These two types of lipids contain polyunsaturated fatty acids.

Sophorolipids are biosurfactants produced by enzymes secreted by *Torulopsis bombicola* (a type of yeast) reacting upon an organic medium (*Laminaria digitata*). They are composed of a disaccharide moiety linked to one hydroxyl group of one w or (w-1)-hydroxy fatty acid. The organic medium of *Laminaria digitata* is rich in lipids: PE, PC, PI, MGDG, and DGDG. These two types of lipids contain polyunsaturated fatty acids. It also contains sugars: GalNac, GlcNac, galactose, mannose, fucose, glucose and xylose.

In one embodiment, the bacteria can be *Bacillus brevis, Bacillus subtilis*, or *Bacillus Licheniformis* and the yeast can be *Candida bombicola, Candida Bogoriensis, Candida Antartica, Torulopsis bombicola, Torulopsis petrophilum*, or *Rhodotorula bogoriensis*.

The solution, once diluted for applications on materials, can be used as fabric cleaner, carpet cleaner, deodorizer, disinfectant, all purpose cleaner, kitchen counter cleaner, window cleaner, bar soap additive, septic and sewage cleaner, driveway and street cleaner, circuit board cleaner, wheel cleaner, toxic waist cleaner, clean-room cleaner, oil spill cleaner, soil treatment, and metal cleaner, among others.

For applications that use the solution as washing detergents, the washing is not an issue. However, for carpet cleaning applications, the carpet is absorbent by nature and difficult to rinse without using large amounts of water, and wet indoor carpet is a haven for the growth of mold, mildew, and bacteria. Biosurfactants are made of organic mater that has been subjected to carefully controlled conditions in which microorganisms are used to biochemical change the organic mater into molecules that are both hydrophilic and hydrophobic. The result of this process is a surfactant that is able to lower the surface tension of water from its normal 72 dynes per centimeter to as low as 27 dynes per centimeter (synthetic surfactants are only able to lower surface tensions into the thirty's). These surfactants are able to remain efficient in a much wider range of conditions than other surfactants. They work in hot or cold water, and at either extreme on the pH scale. They are able to produce cleaning results that are equivalent to solvents. Some other advantages of biosurfactants are they are chemical free, non-toxic, and very biodegradable. They have no diverse effects on the environment. By using biosurfactants in our carpet cleaning solution we are able to clean carpet as well or better than detergents, and not leave a sticky alkaline residue.

Figure 2:
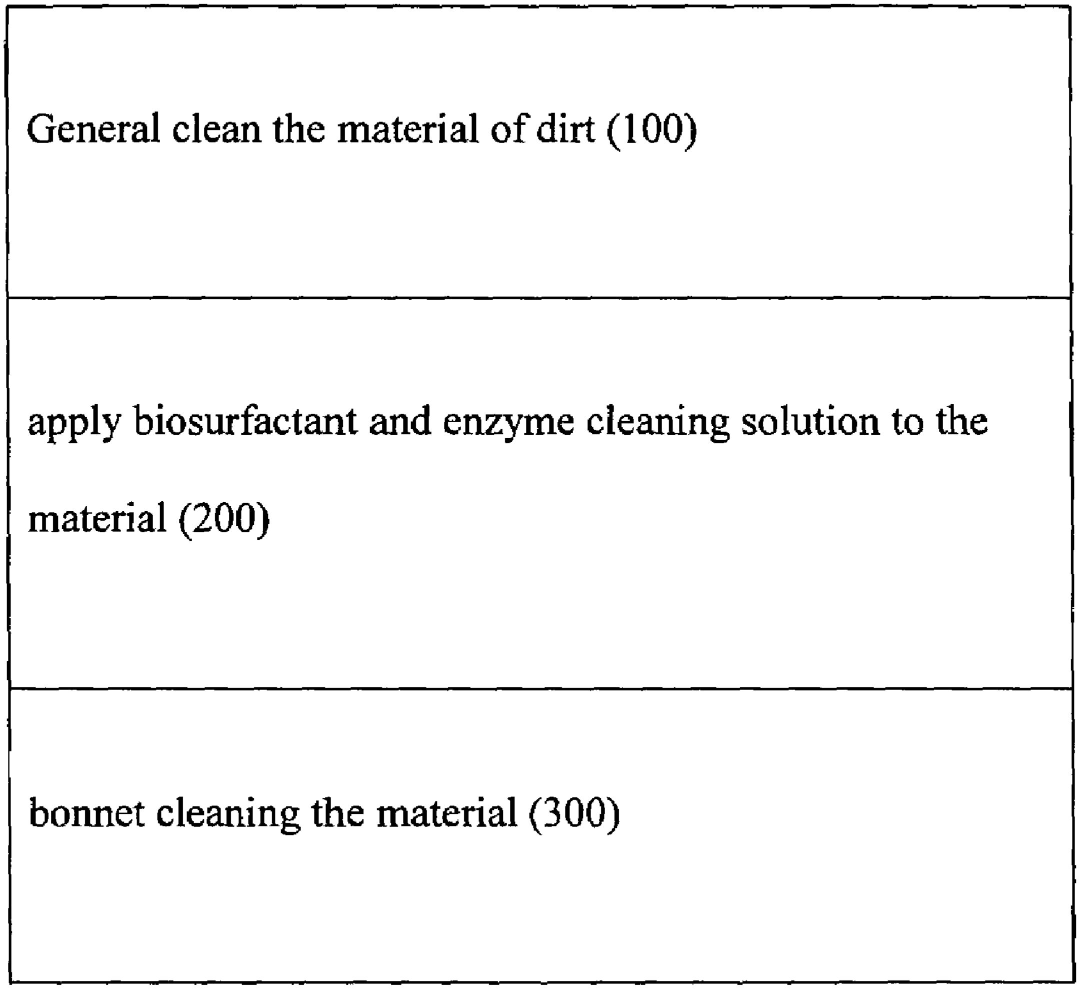
FIG. 2 is a process for cleaning a material such as carpet.

FIG. 2 shows an exemplary process for cleaning a material such as clothing, fabrics, curtains or carpet. The process includes removing dirt from the material (100); applying a biosurfactant to the material (200) and then bonnet cleaning the material (300).

Figure 3:
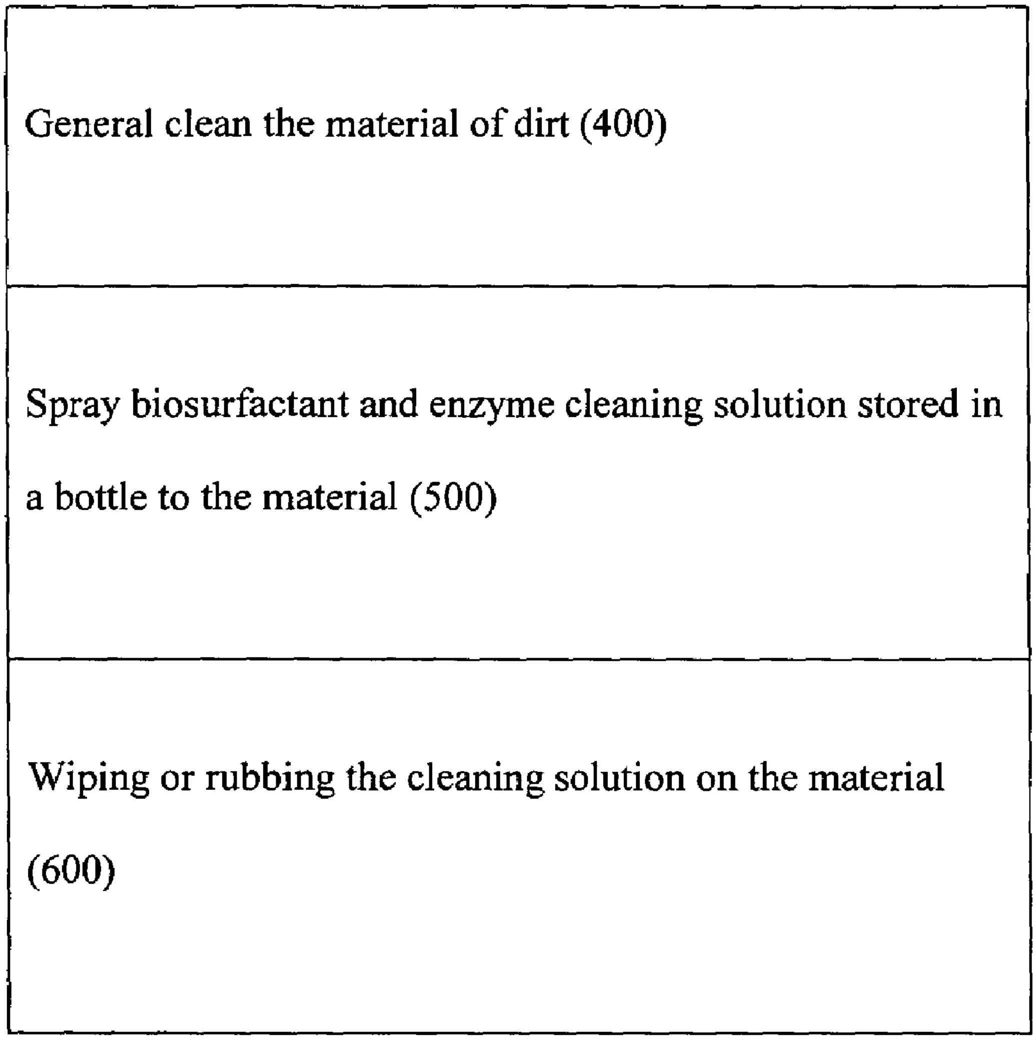
FIG. 3 is a process for spot-cleaning the material such as clothing or carpet.

The process of FIG. 2 is for a full carpet cleaning. During daily use, the carpet may suffer periodic soiling or staining. To fix the stains, a spot cleaner can be used. FIG. 3 shows an exemplary process for spot cleaning a material. First, the user general cleans the material of dirt (400). Next, the user sprays biosurfactant and enzyme cleaning solution stored in a bottle to the material (500). After spraying, the user wipes or rubs the cleaning solution on the material (600).

The cleaning solution includes one or more biosurfactants and enzymes. Instead of conventional synthetic surfactants that work best at high temperatures and at a ph of 9 or greater (alkaline), biosurfactants can work efficiently at hot or cold temperatures and at either extreme of the ph scale. In addition to this they are chemical free. Thus, the solution is non-alkaline, chemical free, and is better at cleaning then conventional detergents.

Two types of biosurfactants can be used: lipopeptides, for their ability to emulsify, and sophorolipids for their ability to attach to and suspend hydrophobic particles. While the biosurfactants are able to release the dirt's and oils from the fibers, the enzymes are able to dissolve it by trading atoms and changing molecules of dirt and oils into gasses and liquids.

Bonnet cleaning does not require that the carpet be overly wet. The agitation provided by the bonnet and buffer allows the system to clean deep down to the base of the fibers, and the bonnet is more than sufficient at absorbing the dirt and small amount of moisture out of the carpet.

During cleaning, the carpet, after being vacuumed, is sprayed with a fine mist of the biosurfactant and enzyme cleaning solution. The solution emulsifies the fibers, releasing the dirt, oils, and other unwanted items. The enzymes in the solution react upon many of these particles; others are suspended away from the fiber by the biosurfactants. Further agitation to aid the biosufactants is provided by the bonnet rotating in a circular motion under a floor buffer. The bonnet is made of nylon and polyester yarn looped through canvas in a sufficient amount to provide a surface that is much more absorbent than the carpet being cleaned. Liquid always takes the curse of least resistance, in the same way that water rolls down hill it also floes to the most absorbent surface. Because the dirt and oils are suspended in the liquid being absorbed by the bonnet, they are also absorbed out of the carpet. In order to assure that the bonnet does not become saturated and therefore unable to absorb, bonnets are changed frequently. Finally, a rake is applied to the carpet to stand the fibers and to remove any swirl patterns left by the bonnet. No rinsing is necessary because the solution does not contain anything undesirable that would need to be rinsed out such as chemicals or alkalinity.

In one embodiment using lipopeptides, Icelandic sea kelp is dried and then crushed into a power form. The drying can be sun-dried or kiln-dried. In another embodiment using lipopeptides, Icelandic sea kelp is crushed, in much the same way grapes are crushed for wine, and strained. Icelandic sea kelp can be used because the waters around Iceland are much less polluted than other waters. This makes for a healthier and higher quality kelp. The resulting organic medium is stored in a sealed sanitized container where it is introduced to *Bacillus lichenformis* (a strain of bacteria commonly found in soil). The bacteria secrete enzymes that react with the medium to produce over time a biosurfactant that is capable of lowering the surface tension of water to 27 mN/m and interfacial tension between water and hexadecane to 0.36 mN/m. Each molecule contains seven amino acids and a lipid portion, which is composed of 8 or 9 methylene groups and a mixture of linear and branched tails. This biosurfactant, like most biosurfactants, also has antibiotic properties. After the process of making the biosurfactant is finished, the bacteria are removed using a centrifugal process. The solution is put into a centrifuge and spun around at 9,000 rpm for 15 minutes. This destroys all of the bacteria without damaging the solution.

Although Icelandic kelp or seaweed is preferred, other types of kelp or seaweed may be used including *Laminaria digitata, Laminaria saccharina, Laminaria cloustoni Edmondst, Fucus versiculosus, Ecklonia maxima, Durvillea antarctica, Pachymenia himantophora, Macrocystis integrifolia, Hypnea chordacea* f. *simpliciuscula, Hypnea charoides, Hypnea japonica, Hypnea cervicomia, Hypnea musciformis, Hypnea bryoids, Hypnea pannosa, Hypnea erecta, Hypnea specifera, Hypnea saidana*, and *Ascophyllum nodosum. Ascophyllum nodosum* seaweed, commonly known as Norwegian Kelp, Common wrack or Rockweed, a brown seaweed.

In one embodiment, a biosurfactant called lipopeptide is used. Lipopeptide, or lipoprotein, normally comprising more than several cyclically-structured amino-acids and a fatty acid combined at an end of their cycle, is a kind of surfactant with hydrophilic and hydrophobic components. The lipopeptides can lower the surface tension of water more than synthetic surfactants can. As an added bonus lipopeptide is also a natural antibiotic. Thus, microbes are more likely to grow on a surface cleaned with bleach than they are to grow on a surface cleaned with said solution because it leaves behind conditions that are inhospitable to the growth of microbes.

Another embodiment uses sophorolipids as biosurfactants. These biosurfactants are produced in much the same way as lipopeptides except Candida (a type of yeast) is used instead of the bacteria. They consist of a dimeric carbohydrate sophorose linked to a long-chain hydroxyl fatty acid. These biosurfactants are a mixture of at least 6 to 9 different hydrophobic sophorosides. This biosurfactant like most biosurfactants also has antibiotic properties.

In one embodiment, one strain of bacteria can be used to provide the lipopeptide. In another embodiment, the bacterial preparations can be a combination of more than several species or strains of lipopeptide-producing bacteria.

An enzyme is a protein or RNA which is capable of initiating a chemical reaction which involves the formation and/or breakage of chemical bonds. Enzymes are catalysts with very precise chemical definitions. They are able to substantially reduce the energy barrier which exists between atoms and prevents atoms from getting close enough to react and form a bond. Enzymes are able to catalyze chemical changes in other molecules, but the enzyme itself remains unchanged regardless of the number of times it reacts on other molecules.

The enzymes used in the cleaning solution are derived from sea kelp. Sea kelp is rich in enzymes. The enzymes present in the sea kelp are used in the cleaning solution.

Because of the particular nature of enzymes, they will not react unless they come in contact with the particular molecules they are specifically designed to react with. As the cleaning solution dries, the enzymes decompose without leaving a trace behind.

The solution is sprayed lightly over the area, in sufficient amount to moisten the carpet but not to soak or thoroughly wet the carpet through. Like ordinary dry cleaning, a carpet can be "spotted" before the general cleaning process, and the cleaning solution can be readily modified, as will be obvious to solve specific problems, such as pet or urine odors and stains, rust, blood, coffee stains, and the like.

The cleaning solution is applied to the carpet, preferably under a predetermined level of pressure. For instance, the cleaning solution could be used in connection with small hand-held rotary cleaning machines for spot cleaning or with other types of commercially available machines, such as a standard floor buffer machine.

In one embodiment for spot cleaning, the cleaning solution is bottled in a spray bottle and sprayed onto a carpeted area. The spot cleaner can be provided in a spray bottle dispenser as a preventive maintenance type cleaner applied onto surfaces proximal to a carpeted area, typically, a hall or passageway, immediately or relatively soon after the area is soiled. By applying the cleaning solution to the area immediately after soiling, build up of wash area related dirt, such as soap scum, is minimized.

The spray bottle dispenser consists of a bottle portion and a spray head portion. The bottle portion has an externally threaded neck portion to which the spray head portion connects by an internally threaded collar. The spray head portion further includes a nozzle portion as well as a housing portion out of which extends a trigger portion for operating a piston to pump fluid inside the housing portion. A dip tube connected to an inlet of the pump extends from the housing portion through the collar portion and into the bottle portion. When the spray head portion is connected to the bottle portion, at least a portion of the dip tube is immersed in the cleaning solution contained in the bottle portion.

Since the solution dissolves lubricants and can cause sprayers to seize and stop spraying, preferably the sprayer keeps lubricant is in side its piston and protected from the solution. Such sprayers are available from SPRAY PLAST S.p.A., Via Monte Tomba 28/A, 1-36060 Romano d'Ezzelino (VI), Italy, among others.

The bottle portion is typically grasped and operated with one hand such that at least one finger, typically, the index finger and perhaps the middle finger, extend to the trigger portion. In operation, the dispenser, and specifically, the nozzle portion of the spray head portion, is held proximally to a surface to which the product in the bottle portion is to be applied. The trigger is then pulled causing product to be pumped through the dip tube into the pump and to the nozzle, out of which the product is sprayed, typically, in a substantially conical spray configuration. Typically, the conical spray configuration produces a circular spray pattern on a surface to which the product is applied provided that the nozzle is held within a predetermined range from the surface during operation.

A towel or a brush is applied to the sprayed region to apply pressure to the effected area. Alternatively, a motorized handle with a small bonnet pad can be used to apply pressure to the effected area to remove the stain.

In another embodiment to clean a large area such as a whole room, the surfactant is sprayed using an industrial size sprayer. A power-driven implement facilitates scrubbing and cleaning of relatively large carpeted areas.

One suitable machine for such maintenance work is a rotary scrubbing machine. The rotary scrubbing machine has an electric motor, a handle extending at an angle upwardly toward the operator from a motor housing, a holding tank, which contains cleaning fluid, positioned on or above the motor housing and a scrubbing, polishing disk or base member attached to the motor drive shaft beneath the motor. The disk or base member includes a cleaning pad or bonnet disposed thereon. This bonnet bears directly on the floor or carpet and applies the cleaning fluid thereto. The combined rotational, lateral and forward movement of the bonnet performs the cleaning and scrubbing action.

In one embodiment, the rotary floor cleaning machine is of the slow speed, swing type having a standard one horsepower electric motor. Such a machine is capable of receiving bonnets having a fifteen to twenty-inch diameter. However, it is understood by those skilled in the art that the present invention is applicable to any type of rotary cleaning machine.

The bonnets can be a mop-like or shag-like consistency in that the surface which bears on the carpet is relatively soft and yielding. More recently, bonnets have been provided with firmer surfaces. These bonnets are made by tightly looping strands of strong synthetic material through a base sheet of material. The resulting bonnet is much like a hooked rug as its working surface is quite firm. The firmer surface is advantageous in that it actively cleans the carpet and loosens a considerable amount of dirt which is lodged deep in the carpet or rug. Other more recent bonnets have included generally radially disposed strips of fibers which are more like the consistency of conventional hair brushes. Still other bonnets combine the above features by providing a basically firm and fabricated-like hooked rug which includes radial strips of fibers and arcuate strips of fibers close to the circular edge of the bonnet. These fibers serve a scrubbing purpose and the firm, hooked-rug-like portion of the bonnet serves to further scrub the floor or carpet and, at the same time, serves to absorb and retain some of the dirt which is released from the floor or carpet. When a bonnet or pad becomes inefficient because it is loaded with soil particles and the like, it may of course be replaced with a clean, dry pad. The soiled pad may be washed for removal of contaminants, and reused.

In the carpet cleaning embodiment, the solution works with bonnet or hot water extraction as a traffic lane cleaner, a browning treatment, a defoamer, odor control with enzymes, an acidity neutralizer, or an anti static solution. The solution is powerful enough to tackle traffic lanes and other heavily soiled areas. The acetic agent removes cellulosic browning, coffee, tea and soda stains. The solution can be used as a rinsing agent to reduce pH on carpets from alkaline cleaning solutions removing detergent and shampoo residues. The solution can be applied with pump sprayer, bonnet or extraction machine. The solution is effective as a foam reducer and saves labor by reducing the frequency of emptying recovery tanks. The solution acts as an enzyme fortified water-soluble deodorant that digests odors at the source. The solution is quick acting without leaving any fragrance on the material. The solution neutralizes a carpet and free it from any alkaline build-up. This product will leave a soft feel and residue free material such as fabrics or carpet. Additionally, the solution disperses electrical charge build-up and eliminate static on the material without contributing to resoiling. The solution is safe on wool and all commercial and residential applications. The solution is the fastest, easiest, and most effective way to clean fabrics or carpets or other materials.

For carpet cleaning, bonnet cleaning has been the preferred method by most commercial maintenance companies because it is more portable, faster drying, and less time consuming. With other bonnet cleaning products, many have found that spots reappear and carpet re soils more quickly. Often they find that they need to go over it periodically with a portable extractor to rinse out the sticky detergent. This is very time consuming and slow to dry. The solution provides the benefits of bonnet cleaning without any of the drawbacks. Using the bonnet method, a carpet cleaner will be able clean about 15,000 square feet of carpet with just one gallon. It dilutes 25.5 to 1, or 5 ounces per gallon of water. Hence, the carpet cleaner can reduce the weight of materials he or she has to maintain in his/her cleaning truck.

While the present invention has been described in terms of a carpet cleaning solution and rotary scrubbing machines, one skilled in the art will realize that the structure and techniques of the present invention can be applied to many appliances. The present invention may be applied in any situation where cleaning is required.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. A method of cleaning a material, comprising:

applying an organic cleaning composition having biosurfactants including lipopeptides and sophorolipids and one or more enzymes derived from sea kelp and produced by microbial action to said material; and agitating the material with the cleaning composition by scrubbing the material with the cleaning composition.

2. The method of claim 1, comprising applying a bacteria and a yeast to form the organic cleaning composition.

3. The method of claim 2, wherein the bacteria comprises one of: *Bacillus brevis, Bacillus subtilis, Bacillus licheniformis.*

4. The method of claim 2, wherein the yeast comprises one of: *Candida bombicola, Candida bogoriensis, Candida antartica, Torulopsis bombicola, Torulopsis petrophilum, Rhodotorula bogoriensis.*

5. The method of claim 1, comprising applying the cleaning composition in one of: fabric cleaner, carpet cleaner, deodorizer, disinfectant, all purpose cleaner, kitchen counter cleaner, window cleaner, bar soap additive, septic and sewage cleaner, driveway and street cleaner, circuit board cleaner, wheel cleaner, toxic waste cleaner, clean-room cleaner, oil spill cleaner, soil treatment, metal cleaner.

6. The method of claim 1, comprising applying a bacteria and a yeast, wherein the bacteria comprises one of: *Bacillus brevis, Bacillus subtilis, Bacillus licheniformis*, and wherein the yeast comprises one of: *Candida bombicola, Candida bogoriensis, Candida antartica, Torulopsis bombicola, Torulopsis petrophilum, Rhodotorula bogoriensis.*

7. The method of claim 6, wherein the enzyme decomposes as the cleaning solution dries.

8. The method of claim 1, comprising using *Laminaria digitata* as an organic medium and enzyme source and *Bacillus licheniformis* to produce lipopeptides.

9. The method of claim 8, wherein the enzyme in the *Laminaria digitata* comprises one of: Amylase, Diastase, Phosphatase, Catalase, Cytochrome, Lactic, oxidoreductases, transferases, hydrolases, lyases, isomerases, Pepsin, Trypsin, thioredoxin peroxidase, bromoperoxidase, mannuronan-C5-epimerase, D-glucanase.

10. The method of claim 1, wherein the enzyme comprises one of: Amylase, Antibiotic, b-Lactamase, Penicillinase.

11. The method of claim 1, wherein the biosurfactant includes a lipophilic part having i-, n-$C_{14}$ or i-, ai-$C^{\beta}{}_{15}$—OH fatty acid linked to a hydrophilic peptide moiety by a lactone linkage.

12. The method of claim 1, comprising forming sophorolipids with enzymes secreted by *Torulopsis bombicola* reacting on an organic medium.

13. The method of claim 12, wherein the organic medium comprises *Laminaria digitata*.

14. The method of claim 1, comprising:

storing the cleaning composition in a spray bottle, said spray bottle maintaining a lubricant inside a piston and wherein the piston is protected from the cleaning composition;

spraying the cleaning composition onto said material; and applying a force to the material.

15. The method of claim 1, comprising:

storing the cleaning solution in a spray bottle, said spray bottle having lubricant maintained inside a piston to prevent exposure of the lubricant to the cleaning solution;

spraying the cleaning solution to a material; and applying a circular rubbing motion to the material.

16. The method of claim 1, wherein the material is a carpet, comprising vacuuming said carpet prior to spraying said cleaning solution and bonnet-cleaning said carpet with a rotary floor cleaning machine.

17. A method of cleaning a material, comprising:

applying an organic cleaning composition having biosurfactants including lipopeptides and sophorolipids and one or more enzymes derived from sea kelp and produced by microbial action to said material, wherein the organic cleaning composition is formed using a bacteria and a yeast; and agitating the material with the cleaning composition, wherein the bacteria comprises one of: *Bacillus brevis, Bacillus subtilis, Bacillus licheniformis* and wherein the yeast comprises one of: *Candida bombicola, Candida bogoriensis, Candida antartica, Torulopsis bombicola, Torulopsis petrophilum, Rhodotorula bogoriensis* by scrubbing the material with the cleaning composition.

* * * * *